Figure 1:
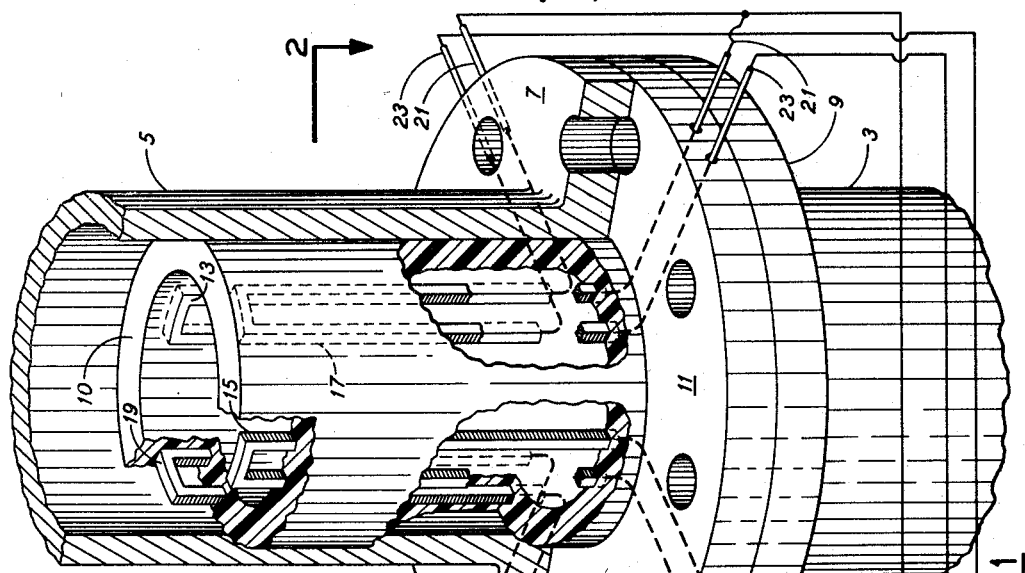

Oct. 14, 1958  J. F. CHITTUM ET AL  2,856,495
RESISTANCE TYPE CORROSION PROBE FOR PIPES
Filed May 21, 1956

INVENTORS
*JOSEPH F. CHITTUM*
*JOHN B. ARMSTRONG*
BY
ATTORNEYS

United States Patent Office 2,856,495
Patented Oct. 14, 1958

2,856,495

RESISTANCE TYPE CORROSION PROBE
FOR PIPES

Joseph F. Chittum, Whittier, and John B. Armstrong, Taft, Calif., assignors, by direct and mesne assignments, to California Research Corporation, San Francisco, Calif., a corporation of Delaware Application May 21, 1956, Serial No. 586,246

6 Claims. (Cl. 201—63)

Our invention relates to apparatus for measuring the rate of corrosion in a pipe and particularly to such apparatus in which the resistance of metal members within the pipe may be measured as an indication of the extent of the corrosion.

Prior art corrosion coupons of which we are aware consisted of metal members located in the flow stream within the pipe. When the operator desired to determine the extent of corrosion within the pipe, he could open the pipe, remove the corrosion coupon and examine it. The amount of corrosion of the metal members on the coupon was an indication of the extent to which the corrosion of the pipe had been extended. Such an arrangement has been found satisfactory in some environments in which little difficulty is encountered as a result of interrupting flow through the pipe so that the corrosion coupon may be examined. We have found, however, that it is more desirable to measure the corrosion within the pipe without taking it apart. Accordingly, we have devised a corrosion coupon combination which permits the amount of corrosion to be determined by measurements made without disassembling the pipe.

Apparatus according to our invention comprises a corrosion coupon combination including a sleeve which lies against the inside of the pipe and a flange-like section which extends between flanges on the pipe to the outside of the pipe. Metal members, at least some of which are of the same material as the pipe, are affixed to the inner surface of the sleeve within the pipe. Electrical conductors extend from the ends of the metal members or coupons through the flange-like section of the coupon combination which lies between the flanges of the pipe to terminals external to the pipe. One metal member lies completely enclosed by the insulating member of the sleeve and has leads extending out of the pipe through the flange-like section. The resistance of all of the metal members may be measured at the conductors as they extend out between the flanges. The rate of increase of the resistance of metal members is an indication of the rate at which they are corroded. The metal member which lies enclosed by the insulating member of the sleeve is not subject to corrosion and therefore serves as a temperature control. The resistance measurements of the exposed members is adjusted in accordance with the temperature as determined by the resistance reading on the enclosed metal member.

Since the sleeve lies against the inner wall of the pipe, it offers a minimum of resistance to flow through the pipe; it does not give rise to conditions which cause abnormal corrosion of the metal coupons or the pipe adjacent the coupon combination. Such a coupon combination adds greatly to the convenience of corrosion measurement, inasmuch as corrosion may be measured without interrupting flow through the pipe or disassembling the pipe. Inasmuch as the corrosion measurements may be made simply and quickly by connecting resistance measuring apparatus, corrosion measurement will be made more frequently, and closer corrosion control may be employed.

Figure 2:
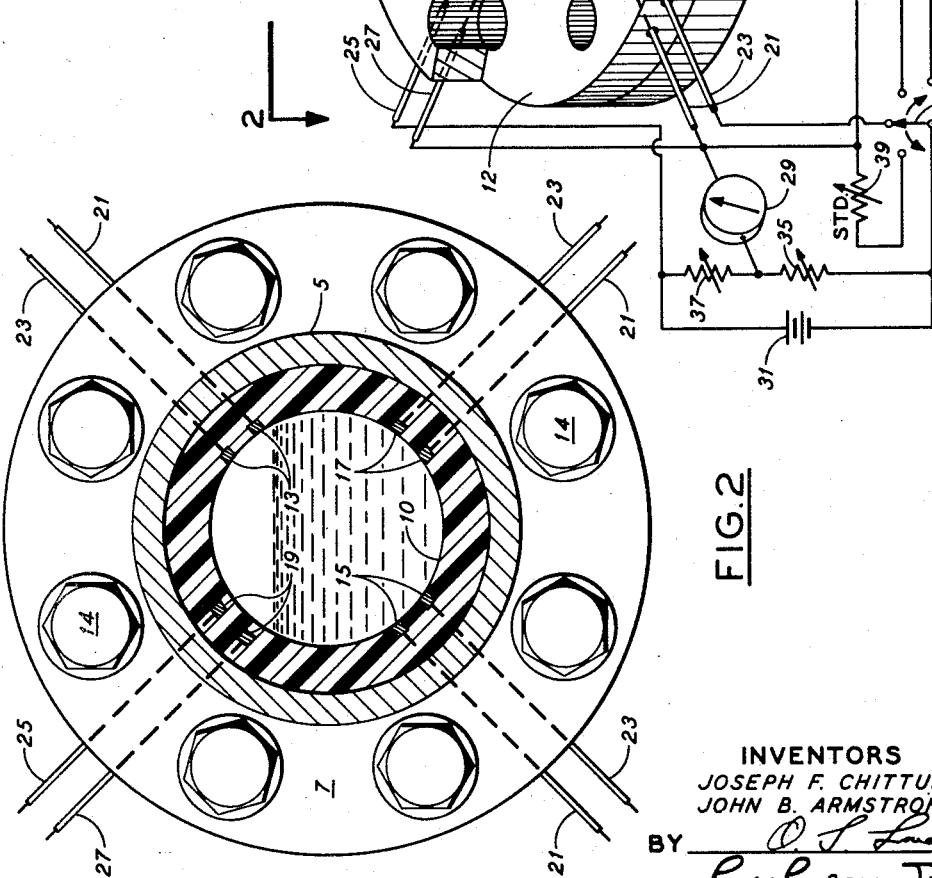

The novel features of our invention are set forth with more particularity in the accompanying claims. The invention itself, however, with respect to the details thereof, together with its additional objects and advantages, may be better understood from the following description of specific embodiments with reference to the accompanying drawings, in which:

Fig. 1 shows a view of a pipe and flange together with a corrosion coupon combination according to our invention; and Fig. 2 shows a cross-sectional plan view taken in the direction of arrows 2—2.

As shown in Fig. 1, the pipes 3 and 5 are joined together at flanges 7 and 9. Corrosion coupon combination 11 has a non-corrosive, insulating sleeve 10 which lies against the inner surface of the pipe 5 and has a flange-like member 12 which extends out of the pipe between the flanges 7 and 9. Bolts 14 hold together the flanges 7 and 9 and provide pressure to form a fluid-tight seal between the flanges 7 and 9 of the pipes 3 and 5. Insulating member 10 of the coupon combination 11 is made of plastic or of another material which is substantially impervious to corrosion by the fluid flowing in the pipes. Buried along the inner wall of the insulating member are three, axially elongated metal corrosion members or coupons 13, 15, and 17. At least one of the elongated surfaces of these metal members 13, 15, and 17 is flush with the inner surface of the insulating member. Desirably, each of the coupons 13, 15, and 17 is formed as a U-shaped element and is connected to a current source 31 and meter 29 through a Wheatstone bridge arrangement by conductors 21 and 23. Temperature control member 19, buried within sleeve member 10, is connected in circuit by conductors 25 and 27. Meter 29 is connected in common to leads 21 and 27 as one junction of the bridge to measure selectively the resistance of each metal member or coupon 13, 15, and 17 in the coupon combination 11. The opposite measuring junction of the bridge is intermediate adjustable resistors 35 and 37. Selective connection of the desired coupon is made by selector switch 33. A standard resistor 39 may be connected into the measuring bridge as a comparison for changing values of resistance in coupons 13, 15, and 17.

At certain levels of the liquid, as shown in Fig. 2, coupons 15 and 17 lie below the surface of the liquid in the pipe. The coupons 13 and 19 lie in the gaseous atmosphere above the liquid. If the operator desires to measure corrosion and determine an indication of the extent to which liquid attacks the pipe, he will, at regular intervals of time, measure the resistance of the coupons 15, 17, and 19. Increases in resistance of the coupons 15 and 17 are attributed to the corrosion of the liquid while changes in the resistance of the coupon 19 are primarily due to temperature changes within the pipe. In order to measure the rate of corrosion due to the gasses within the pipe, the resistance of the coupon 13 is measured. All of the equally spaced apart coupons may be made of the same material as the pipe, in order that corrosive action on the specific material of the pipe may be measured. Alternatively, one of the metal members may be made of a different material in order to determine a measure of the rate of corrosion in the remainder of the system where the components may be made of a different material. One of the metal members may also be made of a different material in which the corrosive action of the fluid is much slower or more rapid. If the corosive action of the fluid is more rapid on a particular metal member, it provides a clearer or more obvious indication of the rate of corrosion. If the action of the corrosive fluid is much slower on one of the metal members than it would be on the pipe itself, that member is useful in situations where the coupon is not replaced after the remaining metal members are corroded sufficiently to form an open circuit.

Alternatively, one of the metal members or coupons may be thicker or thinner than the other coupons. When the coupon combination is newly placed within the pipe, the thicker coupons will provide a more sensitive indication of corrosion rate. Later, the thin coupons may corrode through and the thicker coupons will provide the indication of corrosion rate. In this manner, a highly sensitive coupon combination may be employed in a device which has a life determined by the time required to corrode through the thicker coupons.

The metal member 19 is in effect a resistance thermometer, and its changes in resistance may be converted to temperature, thus providing a correction factor for the resistance of the other remaining metal members.

Thus, it is apparent that we have provided a combination of corrosion coupons which are so placed in a pipeline that they do not interfere with the flow of liquid through the pipe and do not change the streamlines sufficiently to affect appreciably the concentration of corrosion.

While our invention has been described with reference to a specific embodiment, we do not intend to limit it except as set forth in the appended claims.

We claim:

1. Means for supporting metal elements for measuring the corrosive effect of a fluid within a pipe by changes in electrical resistance of said elements comprising a sleeve member composed of material substantially impervious to corrosion by said fluid and proportioned to lie adjacent the inner wall of said pipe, a flange on said sleeve member, said flange extending radially outwardly of said pipe and disposed between complementary flanges on adjacent sections of said pipe, means to connect the said pipe flanges together with the said flange on said sleeve member fixed between them, a first and a second metal element composed of substantially the same material, said first metal element positioned within and completely enclosed by said sleeve member, said second metal element supported by said sleeve member and in contact with said fluid, and electrical conductors extending from separated points on said metal elements through the said flange on said sleeve member to the outside of said pipe.

2. Means for supporting metal elements within a pipe for measuring the corrosive effects of discrete bodies of a liquid and a gas simultaneously contained in said pipe by changes in the electrical resistance of said elements comprising a sleeve member composed of a material substantially impervious to corrosion by said liquid and said gas and proportioned to lie adjacent the inner wall of said pipe, a flange on said sleeve member, said flange extending radially outwardly of said pipe and disposed between complementary flanges on adjacent sections of said pipe, means to connect the said pipe flanges together with said flange on said sleeve member fixed between them, a plurality of metal elements supported by said sleeve member, at least one of said elements positioned on said sleeve member in contact with said liquid, at least one other of said elements positioned on said sleeve member in contact with said gas, a metal element positioned within and completely enclosed by said sleeve, and electrical conductors extending from separated points on each of said metal elements through said flange on said sleeve member to the outside of said pipe.

3. A device for supporting metal elements for testing corrosivity of fluids within a pipe line comprising a sleeve of electrically insulating and corrosion-resistant material, a flange on said sleeve extending radially outwardly therefrom, a metal element enclosed within and surrounded by the material of said sleeve, a second metal element supported on said sleeve with a surface thereof exposed within said pipe, and electrical conductors connected to separated points on each of said metal elements and enclosed by and extending through said sleeve to the radially exterior surface of said flange.

4. The apparatus set forth in claim 2 in which each of the plurality of metal elements comprises a U-shaped metal member affixed to said sleeve and having its elongated dimension parallel to the axis of the pipe and said plurality of metal elements are substantially equally spaced around the circumference of said sleeve.

5. The apparatus according to claim 2 in which said plurality of metal elements includes at least one element constructed of a different material than the other members.

6. Apparatus according to claim 2 in which said plurality of metal elements includes at least one element having an appreciably greater area exposed to a corrosion inducing environment in said pipe than at least one of the other elements.

References Cited in the file of this patent

UNITED STATES PATENTS 2,735,754     Dravnieks _____ Feb. 21, 1956